United States Patent Office 2,728,741
Patented Dec. 27, 1955

2,728,741
PHENOL-FORMALDEHYDE RESINS FOR FOAMING COMPOSITIONS

Eli Simon, Los Angeles, and Frank W. Thomas, Burbank, Calif., assignors to Lockheed Aircraft Corporation, Burbank, Calif.

No Drawing. Application November 1, 1952, Serial No. 318,324

7 Claims. (Cl. 260—43)

This invention relates to reactant foaming compositions or mixtures for producing cellular plastic products and to improved phenolic resins for incorporation in such foaming compositions.

We have discovered that cellular plastic products and materials of superior physical properties and greater uniformity of cell structure are obtained when the phenolic resins are prepared by condensing them in the presence of a special catalyst mixture or system. We have also discovered that the foaming phenolic resin mixtures prepared with such resins are considerably slower to react, permitting the cellular products to be poured or formed in much larger sections and allowing considerably more time for the handling and pouring of the mixtures. These considerations are of major importance in the actual production of commercial products and in production line operations. The phenolic resins are acid catalyzable and water miscible resols characterized by the alkaline catalyst employed in the synthesis or preparation of the resins.

It is, therefore, an object of this invention to provide improved phenolic resins or resols, for incorporation in foaming mixtures for making cellular plastic materials and products, which promote or insure the production of superior cellular plastics and that facilitate the mixing, handling and pouring of the foaming mixtures or compositions.

It is another object of the invention to provide reactant or foaming phenolic resin compositions that are relatively slow in their rates of rise or reaction rates so as to be more readily poured or applied and so as to be suitable for the production of articles and parts of large cross section.

The resins of the invention are primarily derived from the reaction of phenols and aldehydes and their various analogues. The extent of their reaction is determined by the desired specific gravity, viscosity and water miscibility of the resin or resol and is governed to some extent by the improved catalyst. The phenolic resins which we employ in the foaming mixtures for producing the cellular plastic products are acid catalyzable water miscible resol type resins that are the reaction products of phenolic types of compounds such as polyhydric phenols; phenol; amino phenols; halogen, amino, carboxy, nitro, saturated or unsaturated alkyls or aryl substituted phenols, with aldehydes such as formaldehyde, alkyl-aldehydes, aryl aldehydes, poly aldehydes, furan aldehydes, amino or halo aldehydes, nitro substituted aldehydes, etc. Any combination of these with alkyd or aryl amines, aldoses, alcohols or epoxy compounds may be used when such modification is required. It has been found that the physical strength properties of the foamed or cellular plastic products may be controlled to a considerable extent by varying or adjusting the specific gravity of the phenolic resins employed. Thus the specific gravity of the phenolic resin may be varied between 1.15 and 1.35 to attain the desired range or type of physical and chemical properties required in the cellular plastic material.

The reaction of a given phenol with a specific aldehyde takes place in accordance with the established and well known methods. However, the resins are condensed in the presence of the alkaline catalyst of the invention which is a mixture of two alkalies or bases, namely sodium hydroxide and barium hydroxide. The molar proportions or ratios of the alkalies are from $2.0 \times 10^{-4}$ mols to $1.0 \times 10^{-4}$ mols of the barium hydroxide octahydrate to from $1 \times 10^{-2}$ mols to $2 \times 10^{-2}$ mols of the sodium hydroxide. Best results have been obtained where the alkalies are used in the proportion of $1.27 \times 10^{-4}$ mols barium hydroxide octahydrate and $1.6 \times 10^{-2}$ mols of the sodium hydroxide. We have discovered that when the phenolic resins are synthesized employing the catalyst of the invention, with the bases or alkalies utilized within the proportions or ranges just given, they result in the production of cellular foamed products or materials of excellent physical properties and of uniform cellular structure even in large sections, the reactant or foaming mixtures being prepared as described below. However, we have found that these desirable results are not obtainable where the ranges of the barium hydroxide octahydrate and the sodium hydroxide differ appreciably from the ranges given above.

In preparing a typical phenolic resin for use in making the cellular plastic materials, a mixture of:

A phenol _____ 1 mol.
An aldehyde; e. g. formaldehyde_ 1 to 2.5 mols.
The barium hydroxide-sodium
  hydroxide catalyst_____ $1.01 \times 10^{-2}$ to $2.02 \times 10^{-2}$ mols.
Water _____ 10 to 50% of the charge.

is placed in a suitable reactor, the components being combined in the proper sequence. The resin is cooked in the presence of the alkaline catalyst for the required time, neutralized to a pH of from 6.8 to 7 and then stripped to a suitable viscosity.

The following are illustrative formulations of the phenolic resins of the invention suitable for incorporation in the foaming compositions for making the cellular plastic products, the catalyst recited in these formulations being the barium hydroxide-sodium hydroxide catalyst described above.

*Resin 1 (species or types a, b, c, d and e)*

|  | (a) Mols | (b) Mols | (c) Mols | (d) Mols | (e) Mols |
|---|---|---|---|---|---|
| Phenol | 1.0 | 1.0 | 1.0 | 1.0 | 1.0 |
| Formaldehyde | 1.5 | 1.5 | 1.5 | 2.0 | 1.2 |
| Ba(OH)$_2$—8H$_2$O | $1.27 \times 10^{-4}$ | $1.5 \times 10^{-4}$ | $1.4 \times 10^{-4}$ | $2 \times 10^{-4}$ | $1 \times 10^{-4}$ |
| NaOH | $1.6 \times 10^{-2}$ | $1.6 \times 10^{-2}$ | $1.4 \times 10^{-2}$ | $1.6 \times 10^{-2}$ | $1.8 \times 10^{-2}$ |

In the following examples or formulations the ranges of proportions of the barium hydroxide and sodium hydroxide are from:

Ba(OH)$_2$.8H$_2$O _____ 1 to $2 \times 10^{-4}$
NaOH _____ 1 to $2 \times 10^{-2}$ Thus the catalysts of the following examples are prepared from the barium hydroxide and sodium hydroxide employed in the proportion ranges, just specified, of the total resin components or ingredients.

Resin 2

| | |
|---|---|
| Para-isopropyl phenol | 1 mol. |
| Formaldehyde | 1 to 2.5 mols. |
| Catalyst. | |

Resin 3

| | |
|---|---|
| Phenol<br>P, P'sec<br>Butylidenediphenol | 1 mol total (the P, P'sec butylidene-diphenol being in the proportion of from 5 to 75% by mol weight). |
| Formaldehyde | 1 to 2.5 mols. |
| Catalyst. | |

Resin 4

| | |
|---|---|
| Phenol<br>O, O'diphenol | 1 mol total (the O,O'diphenol being in the proportion of from 5 to 75% by mol weight). |
| Formaldehyde | 1 to 2.5 mols. |
| Catalyst. | |

Resin 5

| | |
|---|---|
| Phenol<br>Parachloro phenol | 1 mol total (the parachloro phenol being in the proportion of from 5 to 75% by mol weight). |
| Formaldehyde | 1 to 2.5 mols. |
| Catalyst. | |

Resin 6

| | |
|---|---|
| Parahydroxy benzoic acid<br>Phenol | 1 mol total (the parahydroxy benzoic acid being in the proportion of from 5 to 75% by mol weight). |
| Formaldehyde | 1 to 2.5 mols. |
| Catalyst. | |

Resin 7

| | |
|---|---|
| Phenol<br>Cresol (ortho, meta, para or mixture thereof) | 1 mol total (the cresol being in the proportion of from 5 to 75% by mol weight). |
| Formaldehyde | 1 to 2.5 mols. |
| Catalyst. | |

Resin 8

| | |
|---|---|
| Phenol | 1 mol. |
| Formaldehyde furfural | 1 to 2.5 mols total (the furfural being in the proportion of from 5 to 50% by mol weight). |
| Catalyst. | |

Resin 9

| | |
|---|---|
| Phenol | 1 mol. |
| Acetaldehyde<br>Formaldehyde | 1 to 2.5 mols total (the aceteldehyde being in the proportion of from 5 to 50% by mol weight). |
| Catalyst. | |

Resin 10

| | |
|---|---|
| Phenol | 1 mol. |
| Benzaldehyde<br>Formaldehyde | 1 to 2.5 mols total (the benzaldehyde being in the proportion of from 5 to 50% by mol weight). |
| Catalyst. | |

Resin 11

| | |
|---|---|
| Phenol<br>Para (ortho) nitro phenol | 1 mol total (the para nitro phenol being in the proportion of from 5 to 75% by mol weight). |
| Formaldehyde | 1 to 2.5 mols. |
| Catalyst. | |

Resin 12

| | |
|---|---|
| Alpha (or beta) napthol<br>Phenol | 1 mol total (the napthol being in the proportion of from 5 to 75% by mol weight). |
| Formaldehyde | 1 to 2.5 mols. |
| Catalyst. | |

Resin 13

| | |
|---|---|
| Phenol | 1 mol. |
| Methyl ethyl ketone | 0.5 to 1 mol. |
| Formaldehyde | 1 to 2.5 mols. |
| Catalyst. | |

Resin 14

| | |
|---|---|
| Phenol | 1 mol. |
| Dextrose | 0.5 to 1 mol. |
| Formaldehyde | 1 to 2.5 mols. |
| Catalyst. | |

Resin 15

| | |
|---|---|
| Phenol | 1 mol. |
| Glyoxal (as polyglyoxal)<br>Formaldehyde | 1 to 2.5 mols total (the glyoxal being in the proportion of from 5 to 50% by mol weight). |
| Catalyst. | |

Resin 16

| | |
|---|---|
| Phenol | 1 mol. |
| Ortho hydroxybenzyl alcohol | 0.5 to 1 mol. |
| Formaldehyde | 1 to 2.5 mols. |
| Catalyst. | |

Resin 17

| | |
|---|---|
| Phenol | 1 mol. |
| Furfural | 1 to 2.5 mols. |
| Ketone (acetone, methyl ethyl ketone). | 0.5 to 1 mol. |
| Catalyst. | |

Resin 18

| | |
|---|---|
| Phenol | 1 mol. |
| Formaldehyde | 1 to 2.5 mols. |
| Polyvinyl alcohol | 1 to 15% by weight of the total weight of the phenol and formaldehyde. |
| Catalyst. | |

Cellular plastics of increased toughness, elasticity and flexibility are obtained when polyvinyl alcohol and/or polyvinyl alcohol chloride are used in preparing the phenolic resols. The polyvinyl alcohol or chloride is used in the proportion of from 0.5 to 20% by weight of the combined weight of the other components. In addition to benefiting the physical characteristics or properties of the final cellular plastic product the polyvinyl alcohol serves to control the exothermic temperature during the foaming reaction facilitating the operations and the handling of the mixture during the foaming period. The following typical resin formulations 19 to 28 inclusive, include polyvinyl alcohol.

Resin 19

| | |
|---|---|
| Phenol | 1 mol. |
| Terpineol | 0.25 to 1 mol. |
| Formaldehyde | 1 to 2.5 mols. |
| Catalyst. | |
| Polyvinyl alcohol | 1 to 15% by weight of the combined weight of the other components. |

Resin 20

| | |
|---|---|
| Sodium benzene sulfonate | 0.5 to 1 mol. |
| Phenol | 1 mol. |
| Formaldehyde | 1 to 2.5 mols. |
| Catalyst. | |
| Polyvinyl alcohol | 1 to 15% by weight of the combined weight of the other components. |

Resin 21

| | |
|---|---|
| Glycerol | 0.25 to 1 mol. |
| Phenol | 1 mol. |
| Formaldehyde | 1 to 2.5 mols. |
| Catalyst. | |
| Polyvinyl alcohol | 1 to 15% by weight of the combined weight of the other components. |

In preparing Resin 21, other polyhydric alcohols, such as glycols and amino alcohols may be used instead of the glycerol in the same proportion as the glycerol.

Resin 22

| | |
|---|---|
| Phenol | 1 mol. |
| Formaldehyde | 1 to 2.5 mols. |
| Catalyst. | |
| Epichlorohydrin | 5 to 20% by weight of the combined weight of the phenol and formaldehyde. |
| Polyvinyl alcohol | 1 to 15% by weight of the combined weight of the other components. |

Resin 23

| | |
|---|---|
| Phenol | 1 mol. |
| Furfural<br>Formaldehyde | 1 to 2.5 mols total (the furfural being in the proportion of from 5 to 50% by mol weight). |
| Polyvinyl alcohol | 5 to 50 grams. |
| Catalyst. | |

Resin 24

| | |
|---|---|
| Phenol<br>Bisphenol A (P, P'propylidene-diphenol) | 1 mol total (the bisphenol being in the proportion of from 5 to 75% by mol weight). |
| Formaldehyde | 1 to 2.5 mols. |
| Epichlorohydrin | 0.25 to 1 mol. |
| Catalyst. | |
| Polyvinyl alcohol | 1 to 15% by weight of the combined weight of the other components. |

Resin 25

| | |
|---|---|
| Phenol | ⎫ 1 mol total |
| P, P′diphenol | ⎬ (the P, P′diphenol being in the proportion of from 5 to 75% by mol weight). |
| Epichlorohydrin | 0.25 to 1 mol. |
| Formaldehyde | 1 to 2.5 mols. |
| Catalyst. | |
| Polyvinyl alcohol | 1 to 15% by weight of the combined weight of the other components. |

Resin 26

| | |
|---|---|
| Phenol | ⎫ 1 mol total |
| Resorcinol | ⎬ (the resorcinol being in the proportion of from 5 to 75% by mol weight). |
| Formaldehyde | 1 to 2.5 mols. |
| Catalyst. | |
| Polyvinyl alcohol | 1 to 15% by weight of the combined weight of the other components. |

Resin 27

| | |
|---|---|
| Phenol | ⎫ 1 mol total |
| Catechol (o, m, p) | ⎬ (the catechol being in the proportion of from 5 to 75% by mol weight). |
| Formaldehyde | 1 to 2.5 mols. |
| Catalyst. | |
| Polyvinyl alcohol | 1 to 15% by weight of the combined weight of the other components. |

Resin 28

| | |
|---|---|
| Phenol | 1 mol. |
| Formaldehyde | 1 to 2.5 mols. |
| n-Propylamine | 0.25 to 1 mol. |
| Catalyst. | |
| Polyvinyl alcohol | 1 to 15% by weight of the combined weight of the other components. |

Where formaldehyde is used in synthesizing any of the above phenolic resols it is preferably employed in an aqueous solution having a formaldehyde concentration of from 30 to 40% by weight, usually about 37% by weight.

In preparing the cellular or foamed plastic materials we mix together a phenolic resin such as above described, a gassing or foaming agent and an acid catalyst to obtain a reactant or foaming mixture that may be poured in place, applied by spatula, blading, or the like, as the conditions of use indicate. In general, the components or ingredients of the foaming mixture are used in the proportion of 120 parts by weight of the phenolic resin, from 0.1 to 2 parts by weight of the foaming agent, and from 15 to 25 parts by weight of the catalyst. It is often preferred to use 0.5 gram of the foaming agent and 20 grams of the catalyst to each 120 grams of the phenolic resin or resol.

The foaming agent or agents employed in preparing the reactant or foaming mixture may be selected from the following:

> Aluminum powder
> Zinc powder
> Magnesium powder
> Sodium bicarbonate
> Ammonium bicarbonate
> Potassium bicarbonate
> pp′ Oxybis benzene sulfonyl hydrazide
> Di nitroso pentamethylene tetra amine The metal powders are preferably used in the proportion of from 0.1 to 2 grams for each 120 grams of the phenolic resin. The bicarbonates and the pp′ oxybis benzene sulfonyl hydrazide are preferably employed in the proportion range of from 0.1 to 5 grams per 120 grams of the phenolic resin, and the di nitroso pentamethylene tetra amine is preferably used in the proportion of 0.1 to 1 gram for each 120 grams of the phenolic resol. These foaming or gassing agents may be used separately or in suitable mixtures.

The acid catalyst of the reactant mixture serves to liberate or generate hydrogen, nitrogen, carbon dioxide, or other gas, to produce the foaming of the resin mass and also serves to effect a cure of the foamed resin. The following are catalysts that we have found to be practical and effective in the reactant resinous mixtures of the invention. The preferred ranges of proportions of the invidual catalysts are indicated.

| | |
|---|---|
| I. Hydrochloric acid—6 N aqueous solution | From 5 to 15% by weight of the resin |
| II. Benzene sulfonic acid—20% aqueous solution | From 5 to 15% by weight of the resin |
| III. Toluene sulfonic acid—20% aqueous solution | From 5 to 15% by weight of the resin |
| IV. Potassium acid sulfate—20% aqueous solution | From 5 to 15% by weight of the resin |
| V. Catalyst A | From ½ to 20% by weight of the resin |

Catalyst A contains 20% by weight benzene sulfonic acid, 45% by weight ortho phosphoric acid (85% by weight concentration in an aqueous solution) and 35% by weight water. In Catalyst A the benzene sulfonic acid, or equivalents thereof such as phenol sulfonic acid, meta benzene disulfonic acid or toluene sulfonic acid, may be used in the proportion of from 5 to 50% by weight, the 85% aqueous solution of the ortho phosphoric acid may be used in the proportion of from 10 to 75% by weight and the water in the proportion of from 10 to 70% by weight.

In the following illustrative and typical formulations of the invention for preparing the foaming or reactant mixtures, the proportions of the ingredients are in percentages by weight of the total weight.

Example 1

| | Per cent |
|---|---|
| Resin No. 1(a) | 90 |
| Aluminum leafing powder | 0.1 |
| Catalyst A | 9.9 |

Example 2

| | Per cent |
|---|---|
| Resin No. 1(e) | 94 |
| Potassium bicarbonate | 1 |
| Toluene sulfonic acid (20% aqueous solution) | 5 |

Example 3

| | Per cent |
|---|---|
| Resin No. 18 | 90 |
| Di nitroso pentamethylene tetra amine | 2 |
| Hydrochloric acid (6N) | 2 |
| Catalyst A | 6 |

In preparing the foamed or cellular phenolic resin materials the selected phenolic resin or resol or a selected blend of the resols and the gassing agent, for example a metallic leafing powder, are thoroughly mixed together to form one component or package. Additives such as dyes, fillers, etc. when used are also mixed with these ingredients. In a like manner the barium hydroxide and sodium hydroxide are mixed together to form another component or package. When it is desired to prepare and apply or use the reactant foamed product, these two packages are mixed together and the resultant mixture is then applied by pouring, brushing, blading, dipping, or the like. The foaming reaction which produces the cellular resin product is accompanied by exothermic heat which serves to set the foam or cellular mass and it is usually desirable to post-cure the product for several hours at slightly elevated temperatures.

It is to be understood that the invention is not to be construed as based upon or dependent upon the theories which we have expressed. Nor is the invention to be regarded as limited to the express procedures or materials set forth, these details being given only by way of illustration and to aid in clarifying the invention. We do not regard such specific details as essential to the invention except insofar as they are expressed by way of limitation in the following claims wherein it is our intention to claim all novelty inherent in the invention as broadly as permissible in view of the prior art.

We claim:

1. The condensation product of 1 mol of a phenol, from 1 to 2.5 mols formaldehyde, from $2.0 \times 10^{-4}$ mols to $1.0 \times 10^{-4}$ mols barium hydroxide octahydrate and from $1 \times 10^{-2}$ to $2 \times 10^{-2}$ mols sodium hydroxide, the hydroxides constituting a catalyst.

2. A phenolic resin which is the condensation product of 1 mol of a phenol, from 1 to 2.5 mols formaldehyde, from $1.01 \times 10^{-2}$ mols to $2.02 \times 10^{-2}$ mols of a catalyst comprising barium hydroxide octahydrate and sodium hydrate in the proportion range of the total charge of from $2.0 \times 10^{-4}$ to $1.0 \times 10^{-4}$ mols of the barium hydroxide to from $1 \times 10^{-2}$ to $2 \times 10^{-2}$ mols of the sodium hydroxide, and water in the amount of from 10 to 50% of the total.

3. The phenolic resin which is the condensation product of 1 mol phenol, from 1 to 2 mols formaldehyde, from $2 \times 10^{-4}$ to $1.0 \times 10^{-4}$ mols barium hydroxide octahydrate and from $1.8 \times 10^{-2}$ to $1.4 \times 10^{-2}$ mols sodium hydroxide.

4. A phenolic resin which is the condensation product of 1 mol phenol, 1.5 mols formaldehyde, $1.27 \times 10^{-4}$ mols barium hydroxide octahydrate, and $1.6 \times 10^{-2}$ mols sodium hydroxide.

5. A phenolic resin which is the condensation product of 1 mol phenol, 1.5 mols formaldehyde, $1.5 \times 10^{-4}$ mols barium hydroxide octahydrate, and $1.6 \times 10^{-2}$ mols sodium hydroxide.

6. A phenolic resin which is the condensation product of 1 mol phenol, from 1 to 2.5 mols formaldehyde, polyvinyl alcohol in the amount of from 1 to 15% by weight of the total weight of the phenol and formaldehyde, from 1 to $2 \times 10^{-4}$ mols barium hydroxide octahydrate, and from 1 to $2 \times 10^{-2}$ mols sodium hydroxide.

7. A phenolic resin which is the condensation product of 1 mol phenol, from 0.25 to 1 mol terpineol, from 1 to 2.5 mols formaldehyde, from 1 to $2 \times 10^{-4}$ mols barium hydroxide octahydrate, from 1 to $2 \times 10^{-2}$ mols sodium hydroxide, and polyvinyl alcohol in the amount of from 1 to 15% by weight of the combined weight of the other components.

References Cited in the file of this patent

UNITED STATES PATENTS

| | | |
|---|---|---|
| 2,608,536 | Sterling | Aug. 26, 1952 |
| 2,629,698 | Sterling | Feb. 24, 1953 |